United States Patent Office 3,398,692
Patented Aug. 27, 1968

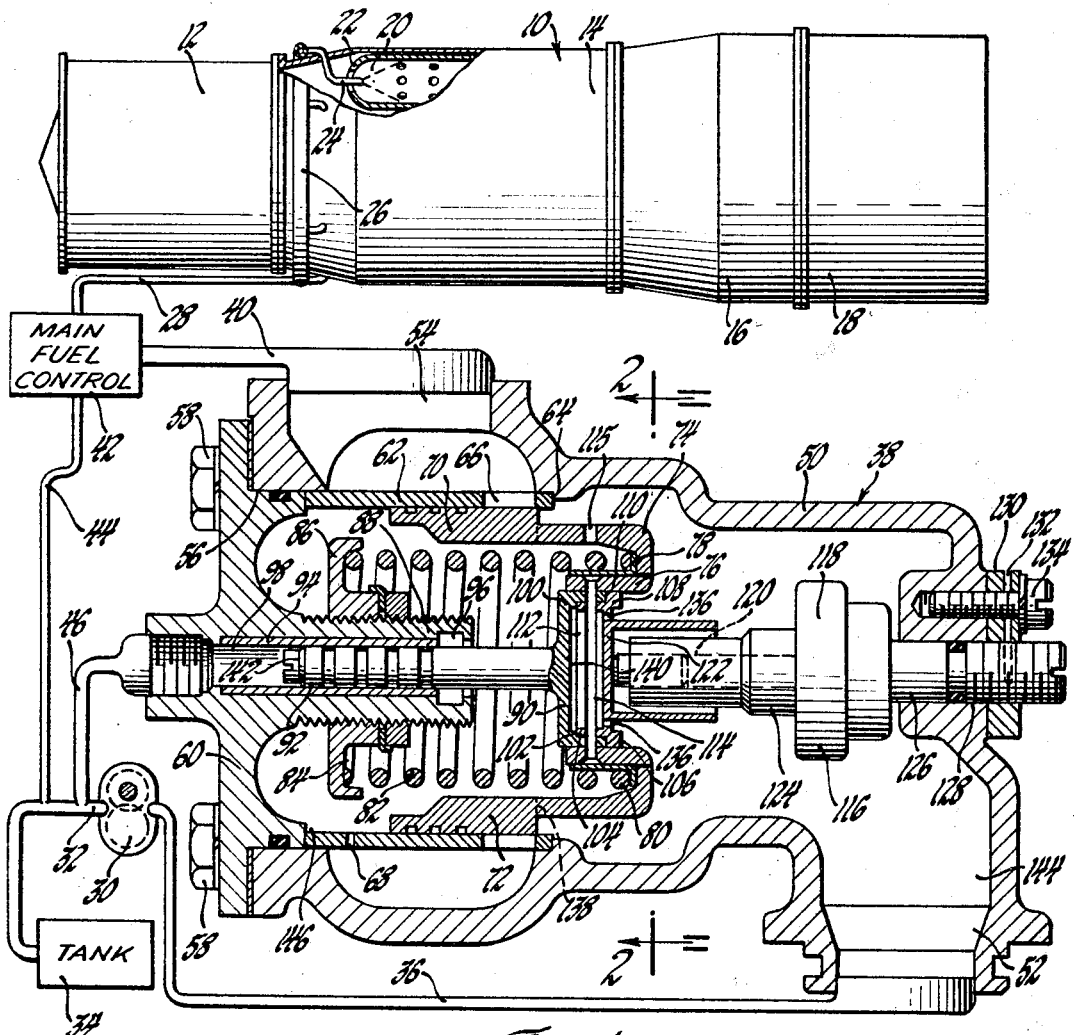

3,398,692
FUEL HEATING APPARATUS
Alfred M. Suggs, Indianapolis, Ind., assignor to General Motors Corporation, Detroit, Mich., a corporation of Delaware
Filed Oct. 5, 1959, Ser. No. 844,336
6 Claims. (Cl. 103—42)

This invention relates to a fuel heating apparatus.

More particularly, this invention relates to an apparatus for heating fuel above the freezing point of the water in the fuel. High altitude aircraft often experience fuel icing problems resulting in some cases in loss of the plane. This icing is caused by the freezing of the water present in the fuel, either in the free state or in solution, the ice forming on the filters or in the fuel control causing fuel blockage or control malfunction.

This invention therefore relates to and has for one of its objects the provision of an apparatus for heating the fuel above a predetermined temperature.

Other objects, features and advantages of the invention will become apparent upon reference to the succeeding detailed description thereof and to the drawings illustrating the preferred embodiment of the invention, wherein, FIGURE 1 is a schematic view of an installation embodying the invention, and FIGURE 2 is a cross-sectional view on a reduced scale taken on a plane indicated by and viewed in the direction of the arrows 2—2 of FIGURE 1.

Referring to the drawings and particularly FIGURE 1, there is shown schematically therein a gas turbine engine 10 of the axial flow type having a compressor section 12, a combustion section 14, a turbine section 16, and an exhaust section 18.

The combustion section 14 is shown as being of the cannular type having a number of circumferentially spaced combustion cans 20 therein, each having at its dome end 22 an opening for the insertion therethrough of a fuel nozzle 24 connected by suitable supporting structure through the engine casing to an annular fuel manifold 26 in turn connected to a fuel heating system to be presently described by conduit means 28.

Further details of the engine beyond those already described will not be given since they may be conventional and are immaterial to an understanding of the invention. The use of the invention in the particular installation described is meant to be merely typical of those with which it could be used and it will be obvious that many different uses of the invention could be made without departing from the scope of the invention.

Referring to the fuel heating system of this invention, only that portion of the general fuel control system relating to the invention will be described since the other details thereof are immaterial and unnecessary for an understanding of the invention. As seen in FIGURE 1, a fuel pump 30 of a conventional positive displacement gear type is provided having an inlet 32 connected to a fuel reservoir or tank 34 and an outlet 36 connected to the fuel heating or deicing valve device 38 to be described presently. The deicing device 38 has a fuel outlet line 40 leading to and connected with a main fuel control illustrated diagrammatically by the block 42 having a fuel bypass line 44 leading to the pump inlet, and a main fuel outlet connecting with the conduit 28 and manifold 26. The deicing device is further provided with a reference fuel pressure line 46 leading therefrom to the inlet of the pump 30.

Referring to the particular details of the deicing device 38, a hollow valve body 50 of the shape shown is suitably bored to provide a fuel inlet 52, a fuel outlet 54, and is open at one side 56 thereof. Adapted to be secured within the opening 56 by suitable means, such as bolts 58 or the like, is an end cover or closure member 60 having a sleeve 62 secured thereto and projecting axially into the valve casing to abut against an annular shoulder 64 provided therein. The sleeve 62 is bored at a number of equally spaced points around the circumference thereof to provide a number of fuel ports 66 through which the primary flow of fuel is controlled from the inlet 52 to the outlet 54. Sleeve 62 also has an orificed opening 68 therein for by-passing a small quantity of fuel at all times to the outlet, as will appear later.

Received within the sleeve 62 for a slideable movement therein is an annular sleeve valve member 70 moveable to a plurality of axial positions for controlling the flow of fuel through the ports 66 from the interior of the valve casing. Sleeve valve 70 has a main annular body portion 72 extended axially at its right end at four circumferentially spaced points therearound, as seen in FIGURE 2, to provide four L-shaped lugs 74 welded or otherwise secured to a ring 76 internally thereof, the lugs 74 together with the ring 76 and flanged retaining sleeve member 78 providing a seat or pocket for one end 80 of a compression spring 82 seated at its opposite end 84 in the pocket of the flange of an adjustable spring retaining member 86 threadedly mounted on a hollow boss 88 extending axially from the cover plate 60.

Secured to sleeve valve 70 by means to be described and positioned internally thereof within the ring 76 is a piston member 90 having a stem end 92 adapted to be slidably received within a sleeve 94 and fiber washer 96 fixed in a bore 98 in the boss 88. At its opposite end, member 90 has an enlarged annular cup-like portion 100 stepped to provide a seat 102 for a ring flange portion 104 of a similar cup-shaped member 106 also having an annular radial flange 108 adapted to abut the axial edge 110 of portion 100, the two members forming a fuel chamber 112 therebetween. Both of said cup-shaped portions 100 and 106 are rigidly secured together and to the ring 76 of sleeve valve 70 by means of a pin 114 inserted through a hole 115 in one of the lugs 74 and extending through suitable holes drilled in ring 76 and members 90 and 106, and secured in place by the slippage of the sleeve retaining member 78 over the ring 76.

Slidably cooperating with the cup-shaped member 106 is a temperature responsive unit 116 having an outer stationary casing 118 slidably supporting a plunger 120 for an axial movement therein in response to predetermined changes in temperature of the fuel in contact with a temperature responsive material within the casing. As shown in dotted lines, the plunger 120 contacts the base 122 of member 106 to move the cup-shaped member 106, piston 90 and sleeve valve 70 simultaneously to the left as seen in the figure upon the attainment of a predetermined fuel temperature. Other details of the temperature ressponsive unit will not be given since they may be conventional and are immaterial to an understanding of the invention. Suffice it to say that the plunger 120 is abutted by an axially expandable or contractible element 124, which may consist of wax impregnated with metal filings, for example, so as to be axially movable in response to a change in temperature of the fuel. In this particular instance, the unit is calibrated so that the plunger will be moved thereby against member 106 to crack open ports 66 at a fuel temperature of 32° F., and, upon further increase in temperature, will continue to move to the left, as seen in FIG. 1, to progressively open the ports further until a fuel temperature of 48° F. is reached, at which point the ports will be fully open. An opposite axial movement occurs upon decrease in temperature. The opposite end 126 of the temperature responsive unit 116, as shown, is inserted through the valve casing at 128 and secured thereto by the threaded engagement therewith of an arcuate slotted locking nut means 130, the slot 132 of which is adapted to be closed by a screw 134 to lock the nut and unit 116 in place.

The radial flange 108 of cup-shaped member 106 is provided around its circumference with a number of circumferentially spaced fuel inlet holes or openings 136 connecting with the fuel chamber 112 so as to permit the force of fuel pressure against the end portion 100 of piston 90. At its opposite end, piston 90 is adapted to be acted upon by the pressure of a reference fluid in bore 98, which in this case is the fluid in line 46 from the pump at the inlet pressure thereof, which may be 50 p.s.i., for example. Since the openings 138 between lugs 74, sleeve valve 70 and ring 76, and openings 136 in member 106 permit the fuel to enter the spring chamber and chamber 112 to act on both sides of the sleeve valve 70, member 106 and portion 100 of piston 90, the pressure on both sides thereof will for all intents and purposes be balanced except for the small cross-sectional area 140 of the face of portion 100 in chamber 112 that is directly opposite to the cross-sectional area of the opposite end 142 of piston 90. Therefore, any buildup in fuel presure will be reflected by an axial force acting against the area 140 of portion 100 opposed by the 50 p.s.i. pressure acting against the opposite end area of piston 90 aided by the force of spring 82.

The buildup in fuel pressure results from a closing of the ports 66 with the pump 30 in operation, since the orifice 68 is insufficient to handle the entire output of the pump. The back pressure on the pump will therefore increase as long as throttling of the fuel through ports 66 by the temperature responsive unit 116 is maintained. The normal operation of the unit 116 will be to permit closing of ports 66 whenever the fuel temperature is below 32° F. Since the temperature rise of a fluid in a pump changes as a linear function of the change in pump pressure, increasing the back pressure on the pump results in a corresponding increase in the fuel temperature. Therefore, the ports 66 will normally stay closed until the back pressure increase is sufficient to raise the fuel temperature to 32° F., at which point the plunger 120 of temperature unit 116 acts against member 106 and sleeve valve 70 to crack open ports 66. The fuel pressure and temeprature will then decrease, causing plunger 120 to return to its original position closing ports 66 again. Thus, the sleeve valve 70 will position itself to throttle the fuel through ports 66 to maintain the fuel temperature above 32° F. In the event the fuel temperature continues to rise, movement of plunger 120 and sleeve valve 70 will fully open ports 66 at 48° F. or above regardless of other conditions.

A maximum fuel pressure control is also provided to assure the safe operation of the pump. It has been found previously by experiments and suitable calculations that the maximum pressure at the pump outlet of the fuel that can be tolerated for efficient operation of the pump and safety considerations is 850–950 p.s.i. Therefore, the force of spring 82 and the area of end 142 of member 90 are so chosen as to cause positive openings of the ports 66 by leftward movement of piston 90 and sleeve valve 70 upon the attainment of a fuel pressure of say, 900 p.s.i., for example, against the area 140 of the face of portion 100, regardless of the temperature of the fuel, which assures that the pump will not be overloaded and subsequently fail by too high a back pressure thereon. Therefore, it will be seen that the invention provides means for throttling the fuel to maintain the fuel temperature above a predetermined amount, with temperature and pressure overcontrols for safety purposes.

While the operation of the invention is believed to be clear from the preceding description and reference to the drawings, a brief resume will now be given.

Assuming a running condition of the engine and a fuel temperature below 32° F., ports 66 are closed by the force of spring 82 and the pressure on the end 142 of piston 90, fuel from the pump 30 has filled the chamber 144 and the chamber 146 containing the spring 82, thereby balancing the pressure on opposite sides of the sleeve valve 70, and the fuel has also filled chamber 112 through the holes 136 in the cup-shaped member 106, which at this time is in the position shown. The fuel in chamber 146 is orificed into outlet 54 through the orifice 68 causing a buildup in the pump back pressure acting on the area 140 of portion 100.

The increase in back pressure raises the fuel temperature to 32° F., at which time the ports 66 are cracked open by the temperature responsive unit 116, if not prior by the pressure level having reached 900 p.s.i., which would overcome the spring and reference pressure forces. A continued rise in temperature causes the ports to be opened further until they become fully open at 48° or beyond. If the temperature drops below 48° F., the ports will become partially closed until fully closed below 32° F., unless again the back pressure level is raised to 900 p.s.i., at whicch point the ports open fully regardless of the temperature.

From the foregoing, therefore, it will be seen that the invention provides a fuel throttling apparatus to prevent the formation of ice on the filters, etc., of a gas turbine engine by maintaining the fuel heated at or above 32° F., with, however, temperature and pressure safety maximums. While the preferred embodiment of the invention has been shown in connection with a gas turbine engine, it will be clear to those skilled in the art to which this invention pertains that many modifications may be made thereto without departing from the scope of the invention.

I claim:

1. A combustion system comprising, in combination, a source of fuel under pressure, a fuel control and a fuel burner connected in series in the order named for controlled supply of fuel from the source to the burner for combustion therein, the system including means interposed between the source and the control effective to throttle the fuel and thereby cause an increase in temperature thereof, and a device responsive to the temperature of the fuel flowing through the said means coupled to the throttling means so as to open the throttling means as fuel temperature rises above a predetermined datum value.

2. A system as recited in claim 1 in which the said predetermined datum value of temperature approximates the freezing temperature of a substance contained in the fuel.

3. A combustion system comprising, in combination, a source of fuel under pressure, a fuel control, and a fuel burner connected in series in the order named for controlled supply of fuel from the source to the burner for combustion therein, the system including means interposed between the source and the control effective to throttle the fuel and thereby cause an increase in temperature thereof, a device responsive to the temperature of the fuel flowing through the said means coupled to the throttling means so as to open the throttling means as fuel temperature rises above a predetermined datum value, and means responsive to pressure of fuel entering the said interposed means operative to open the throttling means in response to pressure above a predetermined level.

4. A combustion system comprising, in combination, a source of fuel, a pump, a fuel control, and a fuel burner connected in series in the order named for controlled supply of fuel from the source to the burner for combustion therein, the system including means interposed between the pump and the control effective to throttle the fuel and thereby cause an increase in temperature thereof, and a device responsive to the temperature of the fuel flowing through the said means coupled to the throttling means so as to open the throttling means as fuel temperature rises above a predetermined datum value.

5. A combustion system comprising in combination, a source of fuel, a pump, a fuel control, and a fuel burner connected in series in the order named for controlled supply of fuel from the source to the burner for combustion therein, the system including means interposed between the pump and the control effective to throttle the fuel and thereby cause an increase in temperature thereof, a device responsive to the temperature of the fuel flowing through the said means coupled to the throttling means so as to open the throttling means as fuel temperature rises above a predetermined datum value, and means responsive to pressure of fuel entering the said interposed means operative to open the throttling means in response to pressure above a predetermined level.

6. A system as recited in claim 5 in which the said predetermined level of pressure is the maximum desired pressure output of the pump.

References Cited

UNITED STATES PATENTS

| | | | |
|---|---|---|---|
| 2,009,137 | 7/1935 | Kleckner | 103—126 |
| 2,534,821 | 12/1950 | Ifield | 137—81 |
| 2,605,709 | 8/1952 | Jubb | 103—12 |
| 2,764.147 | 9/1956 | Brunner | 158—36 |
| 1,639,286 | 8/1927 | Carson | 236—34 |
| 2,399,783 | 5/1946 | Beaven | 158—36 X |
| 2,919,069 | 12/1959 | Freismuth | 236—34 |
| 3,047,055 | 7/1962 | Kimm | 126—247 X |

FREDERICK KETTERER, *Primary Examiner.*